(12) United States Patent
Ngai et al.

(10) Patent No.: US 10,497,179 B2
(45) Date of Patent: Dec. 3, 2019

(54) APPARATUS AND METHOD FOR PERFORMING REAL OBJECT DETECTION AND CONTROL USING A VIRTUAL REALITY HEAD MOUNTED DISPLAY SYSTEM

(71) Applicant: Hong Kong Applied Science and Technology Research Institute Company Limited, Shatin, N.T. (HK)

(72) Inventors: Yat Cheung Ngai, Ma On Shan (HK); Fu Tuen Leung, Yuen Long (HK)

(73) Assignee: Hong Kong Applied Science and Technology Research Institute Company Limited, Shatin, N.T. (HK)

( * ) Notice: Subject to any disclaimer, the term of this patent is extended or adjusted under 35 U.S.C. 154(b) by 18 days.

(21) Appl. No.: 15/903,781

(22) Filed: Feb. 23, 2018

(65) Prior Publication Data
US 2019/0266798 A1 Aug. 29, 2019

(51) Int. Cl.
| | |
|---|---|
| G06T 19/00 | (2011.01) |
| G06F 3/01 | (2006.01) |
| G06F 3/00 | (2006.01) |
| G06K 9/00 | (2006.01) |
| G06F 3/0481 | (2013.01) |
| G06T 13/40 | (2011.01) |

(52) U.S. Cl.
CPC ............ *G06T 19/006* (2013.01); *G06F 3/005* (2013.01); *G06F 3/011* (2013.01); *G06F 3/017* (2013.01); *G06F 3/04815* (2013.01); *G06K 9/00355* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 6,128,004 A | 10/2000 | McDowall et al. | 345/158 |
| 6,690,822 B1 | 2/2004 | Chen et al. | 382/162 |
| 8,055,067 B2 | 11/2011 | Petrescu et al. | 382/164 |
| 9,489,053 B2 | 11/2016 | Latta et al. | G06F 3/017 |
| 9,805,514 B1 | 10/2017 | Benko et al. | G06F 3/011 |
| 2010/0053151 A1 | 3/2010 | Marti et al. | 345/419 |
| 2012/0113223 A1 | 5/2012 | Hilliges et al. | 348/46 |
| 2015/0062165 A1* | 3/2015 | Saito | G02B 27/017 345/633 |

(Continued)

FOREIGN PATENT DOCUMENTS

| | | |
|---|---|---|
| CN | 103106386 A | 5/2013 |
| CN | 104679242 A | 6/2015 |

(Continued)

OTHER PUBLICATIONS

Notification of Transmittal of the International Search Report and the Written Opinion of the International Searching Authority, or the Declaration dated Nov. 16, 2018, issued by the State Intellectual Property Office of the P.R. China.

*Primary Examiner* — Peter Hoang
(74) *Attorney, Agent, or Firm* — Stein IP, LLC

(57) ABSTRACT

An apparatus and method for performing real object detection and control using a Virtual Reality Head Mounted Display System, and more particularly, when the real object detection and control are detecting hand presence and control in free space, in a virtual reality environment, the control being, for example, gestures or movement, in the free space.

8 Claims, 12 Drawing Sheets

(56) References Cited

U.S. PATENT DOCUMENTS

| | | | |
|---|---|---|---|
| 2015/0258432 A1 | 9/2015 | Stafford et al. | A63F 13/213 |
| 2016/0350975 A1* | 12/2016 | Nakagawa | G06T 19/006 |
| 2016/0363996 A1 | 12/2016 | Higgins et al. | G06F 33/014 |
| 2017/0092002 A1 | 3/2017 | Mullins et al. | G06T 19/006 |
| 2017/0185830 A1 | 6/2017 | Srivastava | |

FOREIGN PATENT DOCUMENTS

| | | |
|---|---|---|
| CN | 105405143 A | 3/2016 |
| CN | 106933350 A | 7/2017 |
| WO | WO 2016/118606 A1 | 7/2016 |
| WO | WO 2017/084319 A1 | 5/2017 |
| WO | WO 2017/139871 A1 | 8/2017 |

* cited by examiner

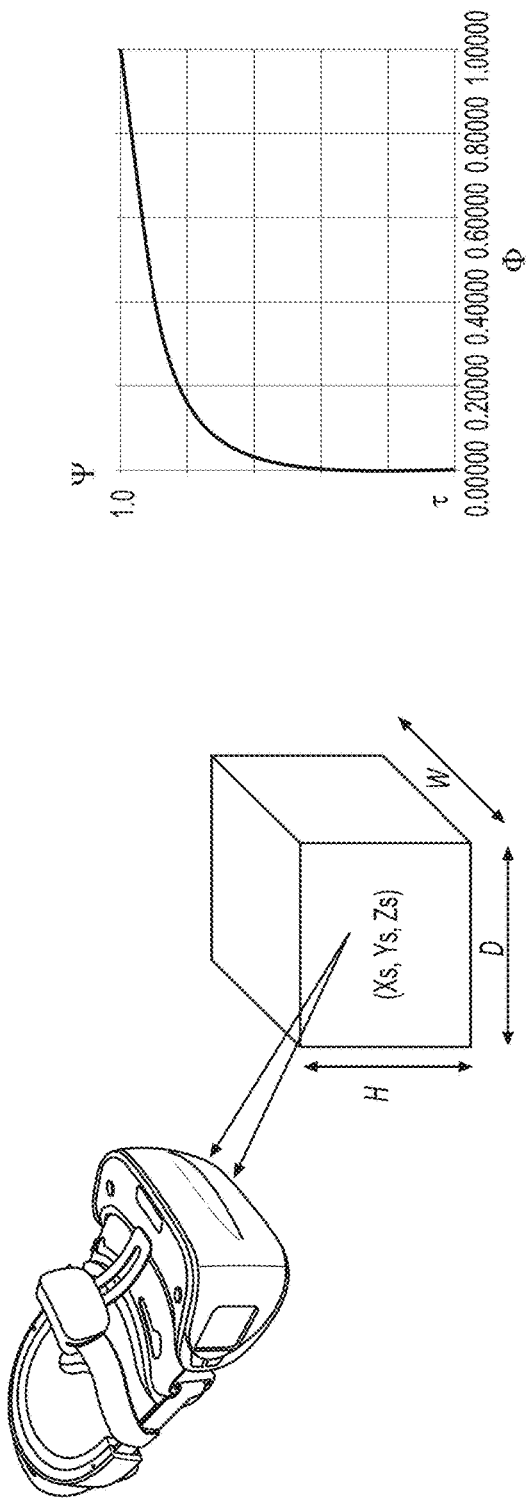
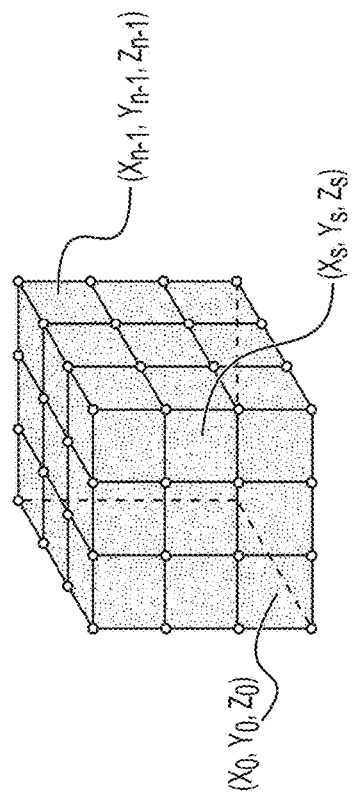
FIG. 5C
FIG. 5B
FIG. 5A

OPERATE VIRTUAL OBJECTS

DOUBLE TAP

HORIZONTAL SWIPE

APPARATUS AND METHOD FOR PERFORMING REAL OBJECT DETECTION AND CONTROL USING A VIRTUAL REALITY HEAD MOUNTED DISPLAY SYSTEM

BACKGROUND OF THE INVENTION

1. Field of Invention

Aspects of the present invention relate to an apparatus and method for performing real object detection and control Using a Virtual Reality Head Mounted Display System, and more particularly, but not limited to, when the real object and control are detected, such as hand presence and gestures in a virtual reality environment.

In most virtual reality (VR) applications, intuitive exploration of virtual worlds and natural interaction play important roles. Therefore, it is highly desirable that users get visual feedback about their body in a virtual environment. Such visual feedback has various benefits to incorporate a realistic visualization of an articulated virtual body in a virtual reality environment, which can be controlled in real-time by the users' physical movements and viewed from an egocentric perspective.

However, the most natural way, such as using bare hands to operate a graphical user interface (GUI) in the virtual reality environment or touch virtual objects in the VR environment are not yet popular. The major VR head mounted display (HMD) (also referred to as VR headset or VR goggle) systems in the current market do not have an intelligent and efficient way for user operation. Most of them are still using a bulky gamepad controller, touch pad, head rotation, etc.

SUMMARY OF THE INVENTION

In light of the above, a VR HMD system and a method to detect hand presence in free space and make use of the hand detection for control (such as hand gestures/movements) in a VR application or environment using the VR HMD system according to embodiments of the present invention are disclosed. Specifically, embodiments of the present invention are disclosed that teach a VR HMD system and a method to divide free space into different zones and apply change in color detected in each zone for hand presence detection and hand control.

According to an aspect of the present invention, provided is a method of detecting presence and control of a real object in a virtual reality environment, comprising:

taking color pixel values of captured images in a field of view of an image sensor, and alpha-blending the color pixels of the captured images with a virtual reality background using varied alpha values based on a function of target color probability density functions of the captured images; receiving inputs of the real object which operates a graphical user interface (GUI) or a virtual object in virtual reality by using different kinds of real object movements or moving the real object in or to a particular position or positions in a real space; detecting a color change sequence at the particular position or positions in the real space; and rendering the corresponding change of the GUI or virtual object to the color change sequence at the particular position or positions based upon the received inputs of the real object.

According to another aspect of the present invention, provided is a system to detect presence and movement of a real object in a virtual reality environment, comprising:

an image sensor to take color pixel values of captured images in a field of view; and
a processor comprising:
a real object presence module alpha-blending the color pixels of the captured images with a virtual reality background using varied alpha values based on a function of target color probability density functions of the captured images;
a real object control module:
to receive inputs of the real object which operates a graphical user interface (GUI) or a virtual object in virtual reality by using different kinds of real object movements or moving the real object in or to a particular position or positions in a real space, and to detect a color change sequence at the particular position or positions in the real space; and
a rendering module to render the corresponding change of the GUI or virtual object to the color change sequence at the particular position or positions based upon the received inputs of the real object.

According to another aspect of the present invention, provided is a non-transitory machine-readable medium comprising instructions that, when executed by one or more processors of a head mounted display system, cause the medium to perform operations comprising:

taking color pixel values of captured images in a field of view of an image sensor, and alpha-blending the color pixels of the captured images with a virtual reality background using varied alpha values based on a function of target color probability density functions of the captured images; receiving inputs of the real object which operates a graphical user interface (GUI) or a virtual object in virtual reality by using different kinds of real object movements or moving the real object in or to a particular position or positions in a real space; detecting a color change sequence at the particular position or positions in the real space; and rendering the corresponding change of the GUI or virtual object to the color change sequence at the particular position or positions based upon the received inputs of the real object.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A-5C illustrate diagrams of (a) a real space block; (b) a merged reality space composed of n real space blocks; and (c) a pre-defined mapping function of skin color probability to alpha blending value with VR according to an embodiment of the present invention.

DETAILED DESCRIPTION OF THE EMBODIMENTS

Figure 1A:
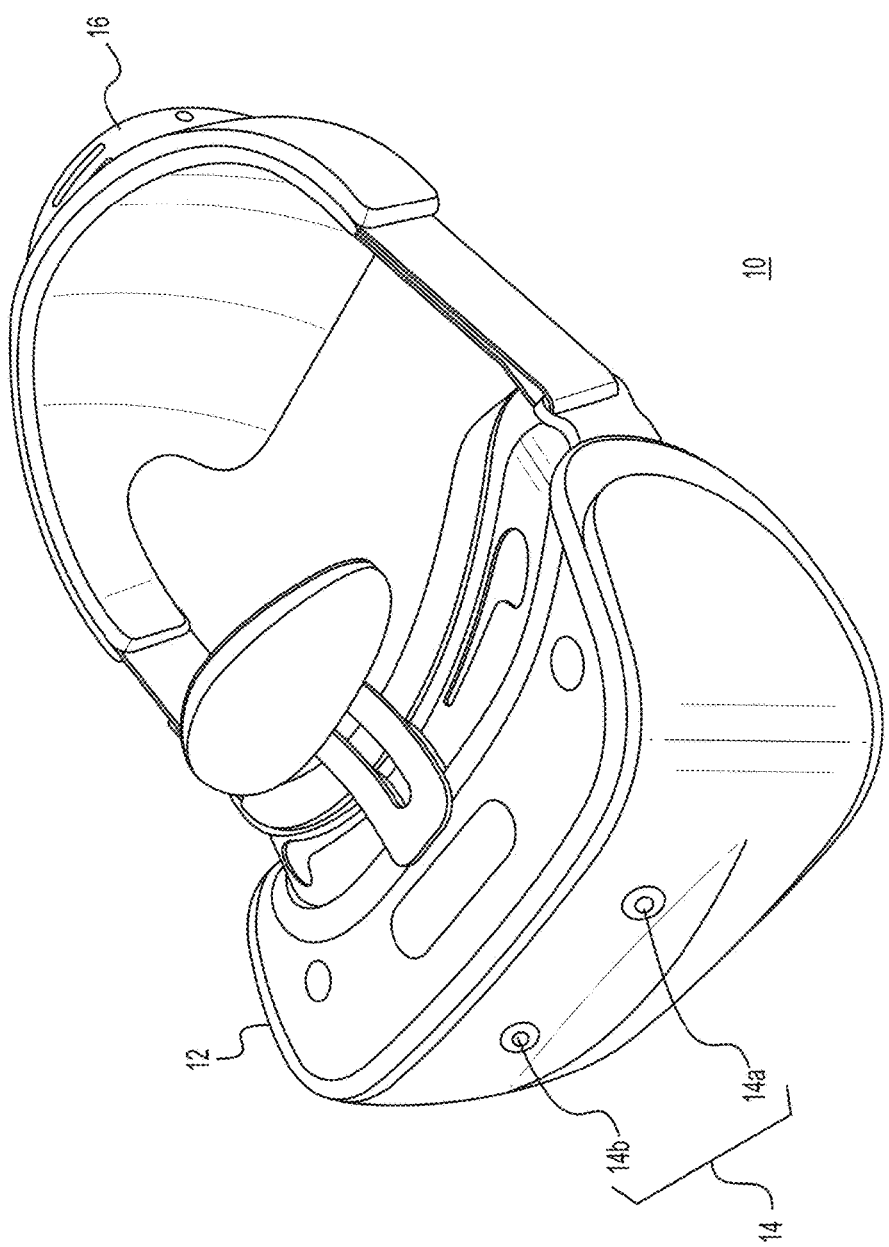
FIG. 1A is a front perspective view of a virtual reality head mounted display (HMD) or headset

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1B:
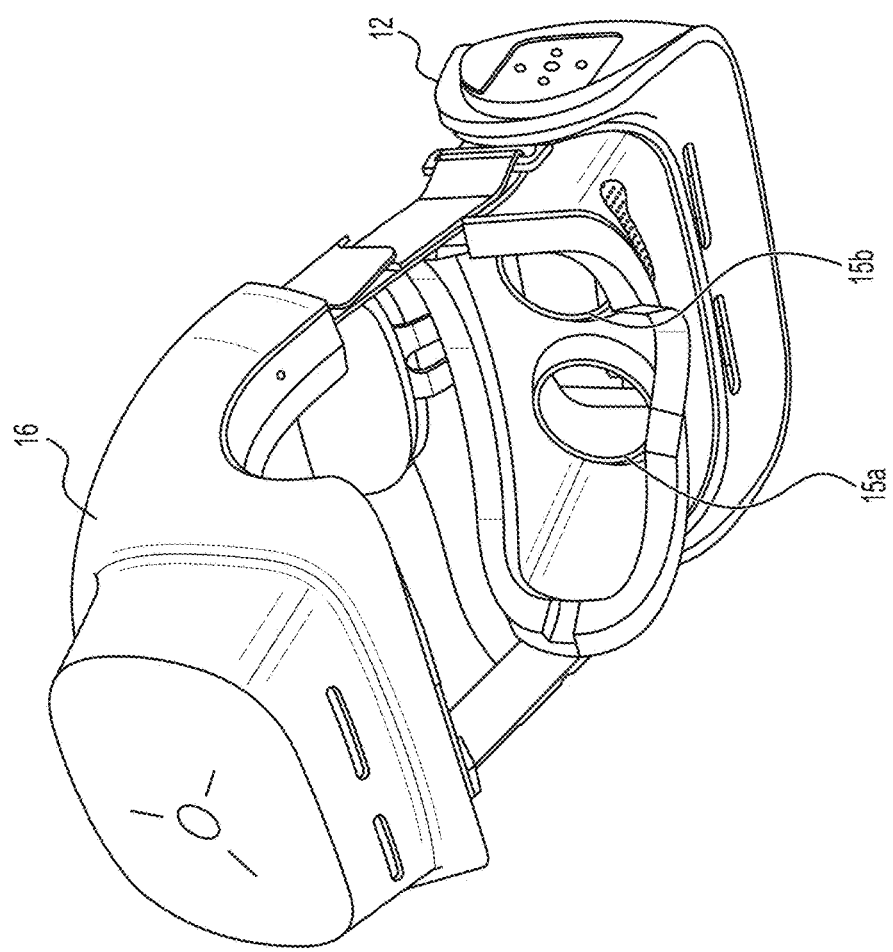
FIG. 1B is a rear perspective view of the VR HMD.
Figure 1C:
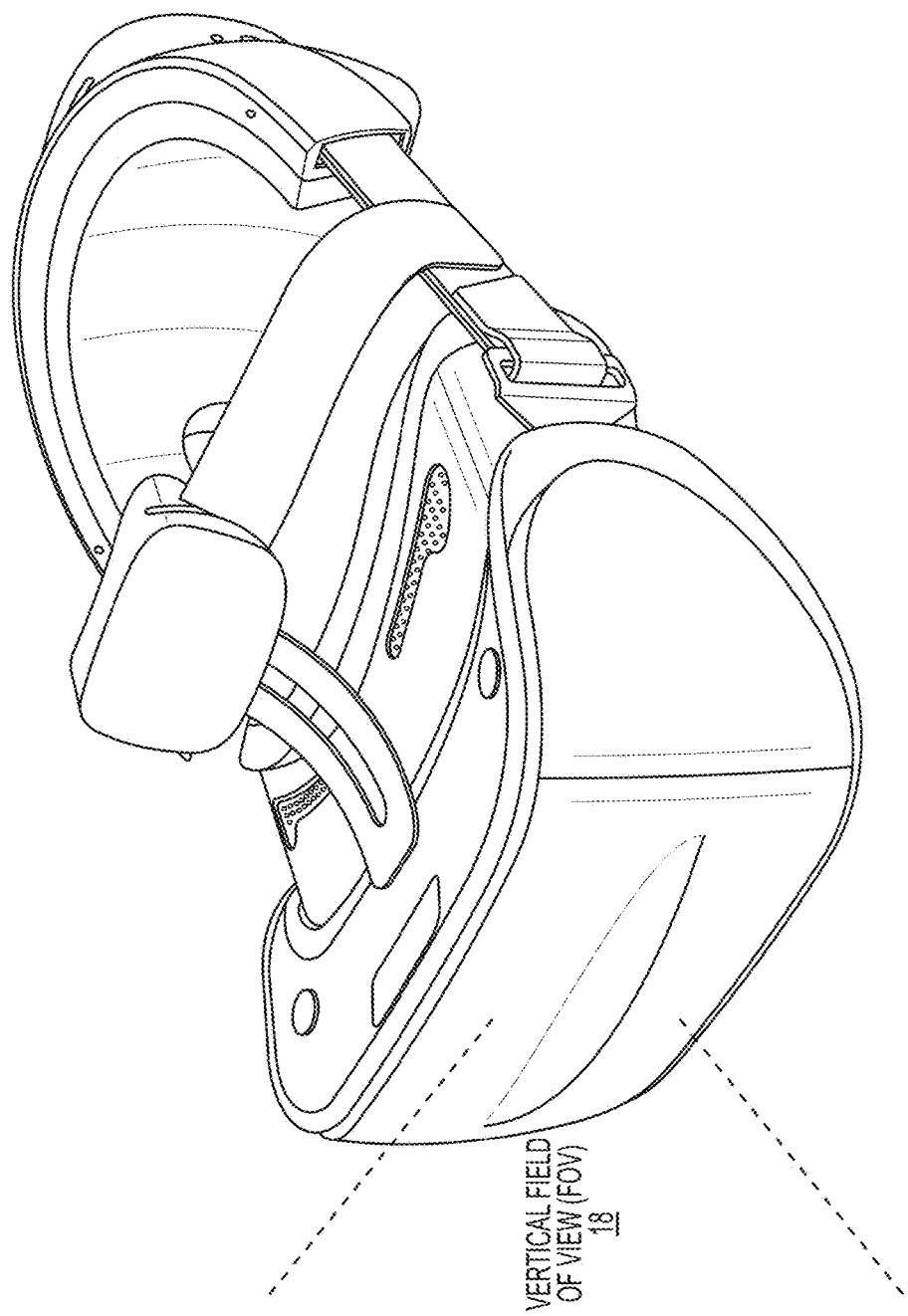
FIG. 1C shows a vertical field of view of the VR HMD.
Figure 1D:
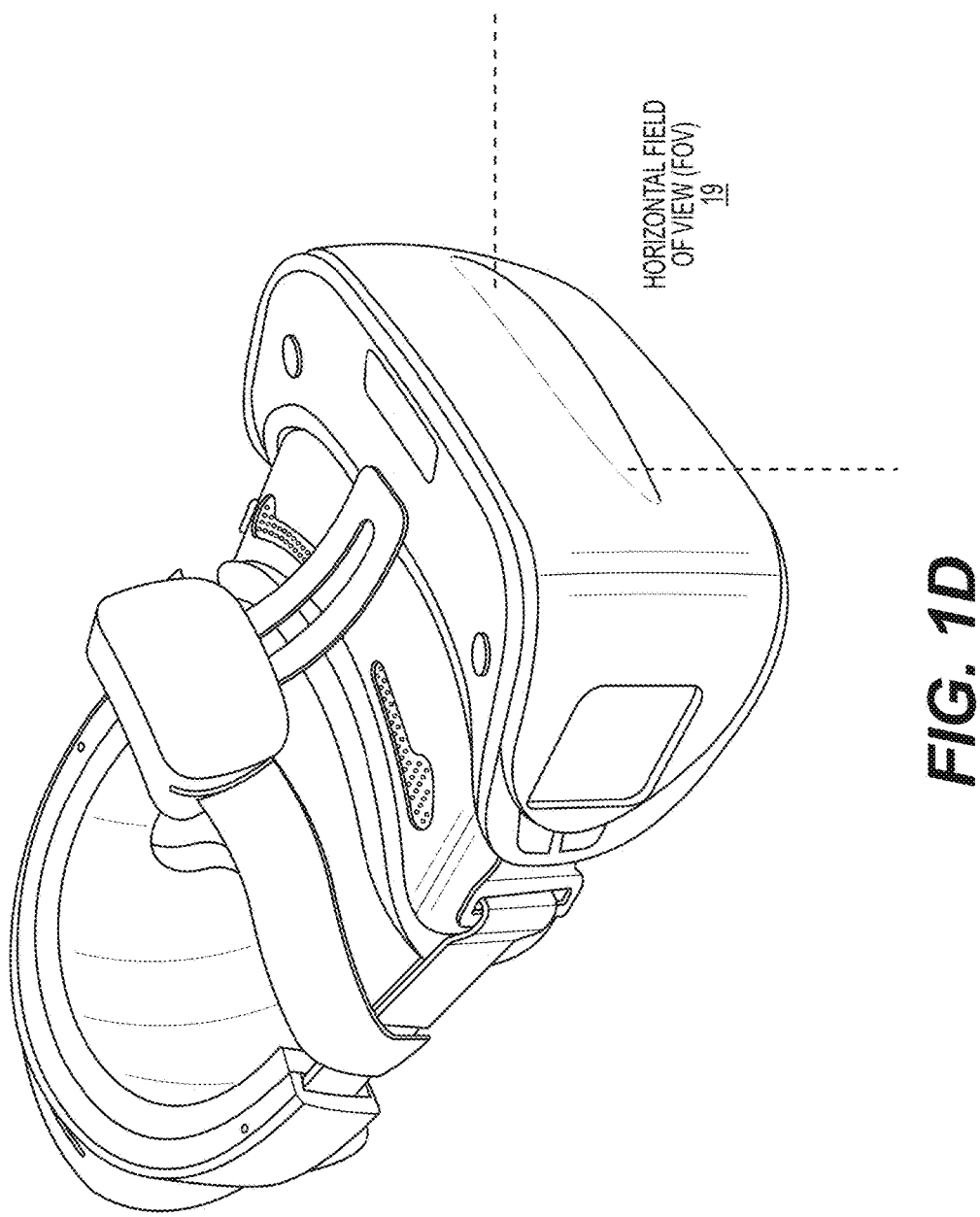
FIG. 1D shows a horizontal field of view of the VR HMD according to an embodiment of the present invention.

In the disclosure below, the phrase "virtual reality" is used generically to describe both virtual reality and augmented reality to simplify the following descriptions. FIG. 1A is a front perspective view of a virtual reality head mounted display (HMD) or headset FIG. 1B is a rear perspective view of the VR HMD, FIG. 1C shows a vertical field of view of the VR HMD, and FIG. 1D shows a horizontal field of view of the VR HMD according to an embodiment of the present invention.

A virtual reality head mounted display (VR HMD) 10 comprises a housing 12, an image sensor comprising left and right stereo cameras 14a and 14b, and a headstrap 16. The housing 12 houses electronics of the VR HMD 10. A user places the VR HMD 10 on his or her head and tightens the headstrap 16 around a head of a user (not shown), to maintain the VR HMD 10 in place on the head. A display 17 enables the user to view the VR environment.

The left and right stereo cameras 14a and 14b are used to view a real object, such as a hand in vertical and horizontal field of views (FOVs) 18 and 19.

Figure 2:
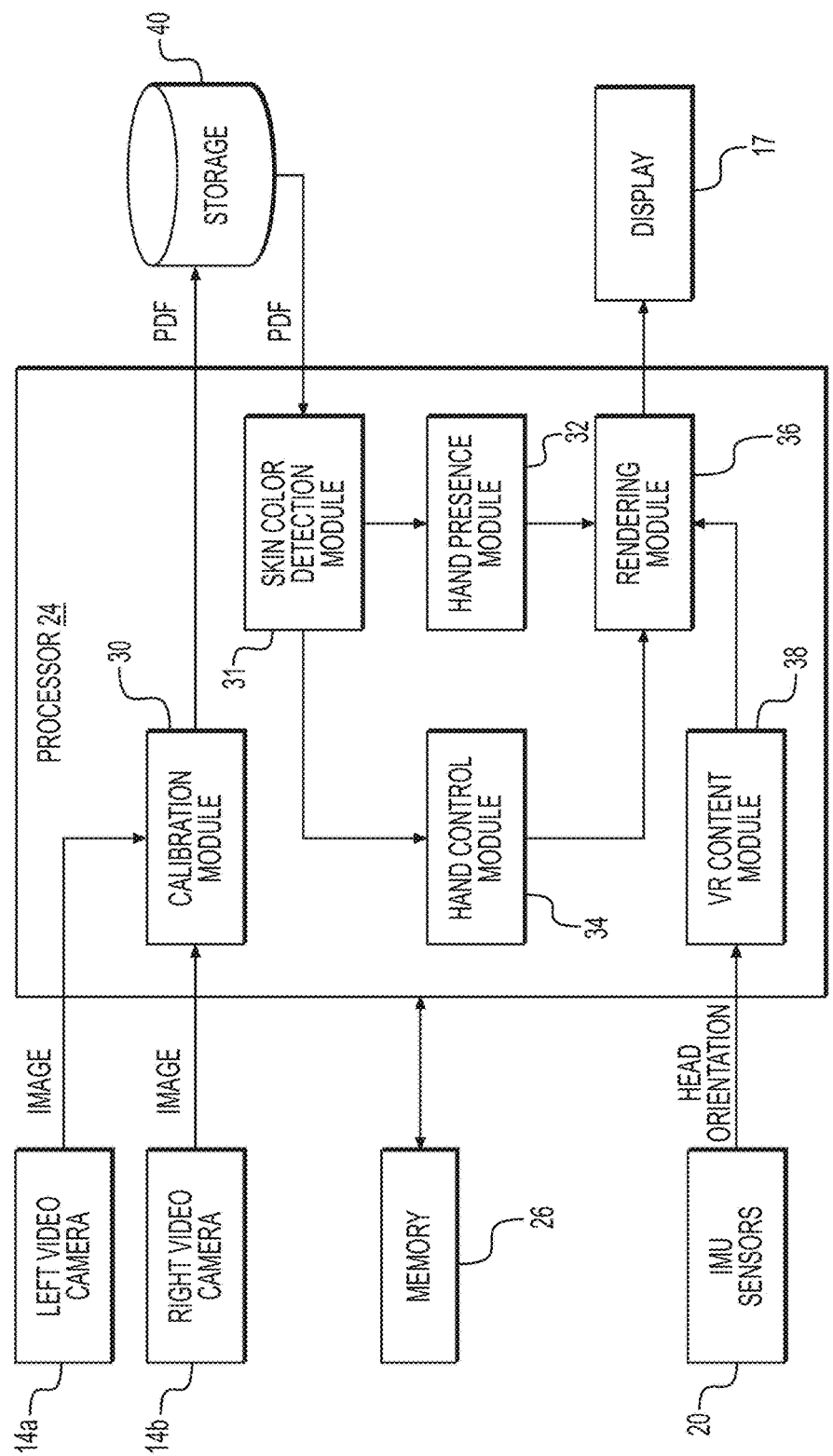
FIG. 2 illustrates a schematic block diagram of the virtual reality head mounted display (VR HMD) according to an embodiment of the present invention.

FIG. 2 illustrates a schematic block diagram of the VR HMD 10 according to an embodiment of the present invention.

Inertial measurement unit (IMU) sensors 20 are used to perform rotational tracking of head orientation of a user of the VR HMD 10. A processor 24 controls the overall operation of the VR HMD 10 by executing an operating system program and one or more application programs stored in a memory 26. The processor 24 may be singular or plural, and may be, but not limited to, a CPU, GPU, DSP, APU, or FPGA. The memory 26 may be singular or plural, and may be, but not limited to, being volatile or non-volatile, such an SDRAM, DRAM, SRAM, Flash Memory, MRAM, F-RAM, or P-RAM. The processor 24 receives image data from the left and right video cameras 14a, 14b, which the processor 24 displays on lenses 15a, 15b and it is possible for the image data to be displayed on the display 17 which may be singular or plural in number. Thus, the VR HMD 10 can be connected to the display 17 which supports the HDMI connection. In a camera mode, the left and right video cameras 14a, 14b and the IMU sensors 20 direct real-world outputs to the processor 24 so that the user can see the real-world around the user, as well as augmented reality (AR) video content.

The processor 24 includes a calibration module 30, a skin color detection module 31, a hand presence module 32, a hand control module 34, a rendering module 36, and a VR content module 38. The VR content module 38 receives head orientation data from the IMU sensors 20. A storage 40, which may, but not limited to being non-volatile, such as a hard disk, stores target color probability density functions from the calibration module 30.

In a broader sense, since the embodiments of the present invention can encompass a real object that is not a hand, the skin color detection module 31, the hand presence module 32 and the hand control module 34 may be referred to as the real object color detection module 31, the real object presence module 32 and the real object control module 34, respectively, instead.

The left and right video cameras 14a, 14b and the IMU sensors 20 are located in the HMD body 12. It is described that the processor 24, memory 26, display 16 and the storage 40 are part of the VR HMD 10, however, these elements can be situated external to the VR HMD 10, and may be considered, along with the other elements of FIG. 2 as being part of a VR HMD system.

The VR content module 38 provides content such as game, panoramic 360 video/picture or any VR graphics. All these contents are rendered according to user's head orientation (pitch, yaw, row). Therefore, the VR content module 38 receives data from the IMU sensors 20. In general, the VR content module 38 stores VR applications.

Figure 3:
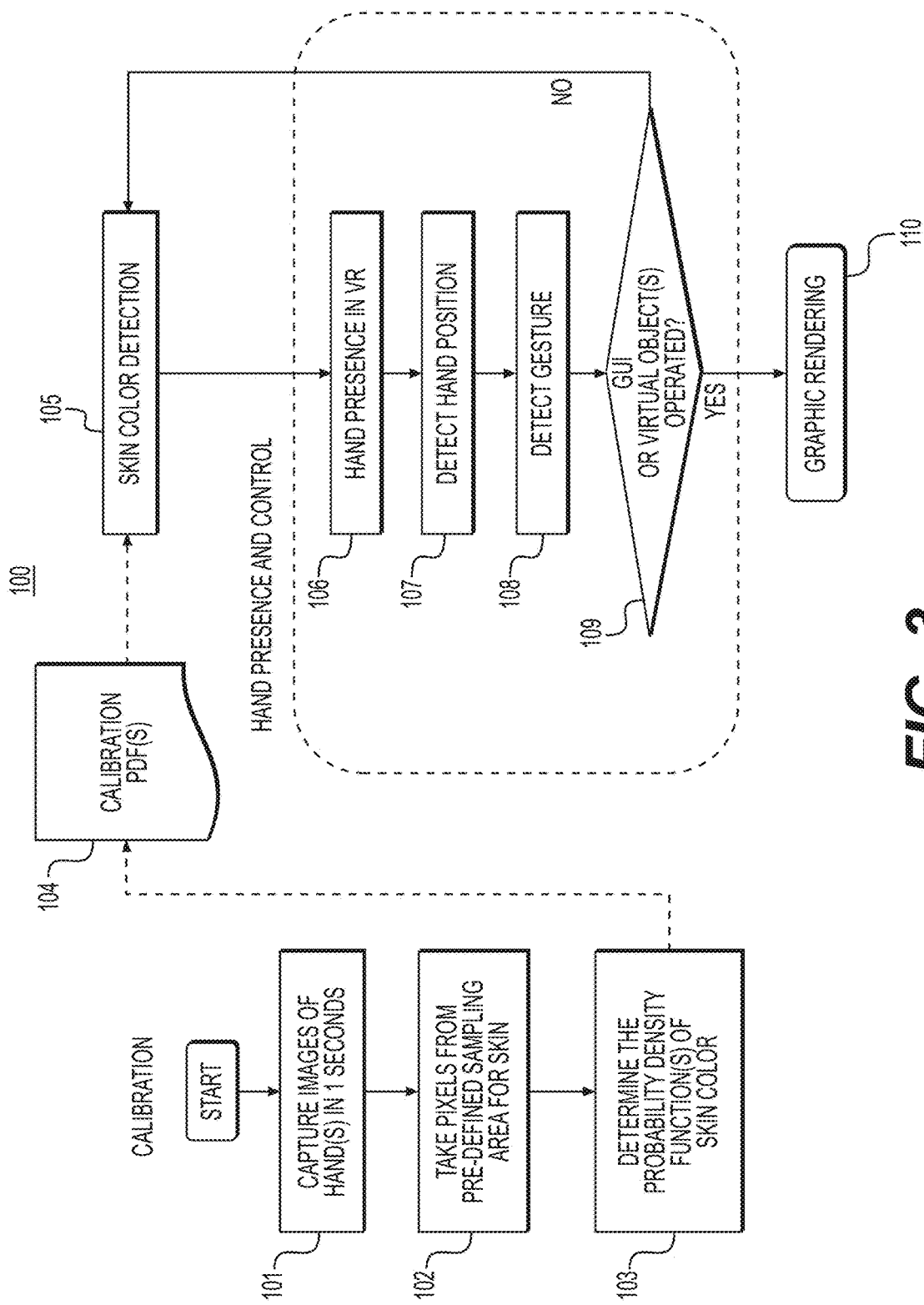
FIG. 3 illustrates a flow diagram demonstrating a method for calibration and hand presence and control in a VR application based upon a user's skin color according to an embodiment of the present invention.

A method 100 to calibrate and determine real objects and control in a virtual reality environment are shown in FIG. 3 according to an embodiment of the present invention and is performed by the processor 24. It is to be noted that the real objects are described as being hands in the present embodiment, although it should be understood that real objects other than hands may be utilized according to embodiments of the present invention.

The memory 22 may comprise a non-transitory machine-readable medium, a machine-readable storage medium, a computer-readable storage medium, or any suitable combination thereof which stores a non-transitory, tangible computer program product comprising computer program code which when executed on the processor 24 is arranged to perform any of the following methodologies.

The calibration is performed by the calibration module 30 in steps 101-104 of FIG. 3.

Figure 4A:
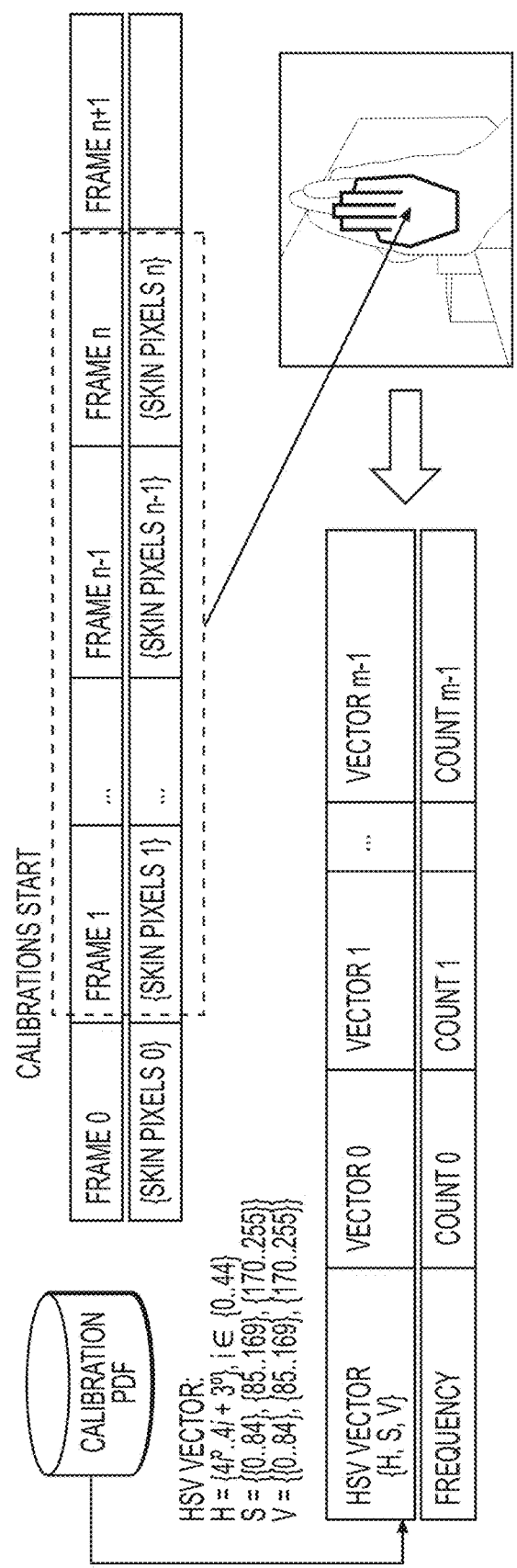
FIGS. 4A and 4B are diagrams demonstrating how to obtain skin color detection calibration probability density functions (PDF) and hand detection color distribution, respectively.

At step 101, the left and right video cameras 14a, 14b (image sensor), capture images of a hand or hands of the user that are in the vertical and horizontal fields of view –18, 19 within 1 second as shown in FIG. 4A, although it is readily understand that this time may vary. The captured images are provided to the calibration module 30 of the processor 24. The processor 24 finds target color probability density functions (PDFs) in HSV (hue, saturation and value) color space by collecting color pixel values from a real object, such as a hand, in a finite set of captured images as data samples during a calibration process.

At step 102, color pixel values of pixels from a pre-defined sampling area for skin, the pre-defined sampling area being the area bounded by the hand shape as shown in FIG. 4A, are taken.

Figure 4B:
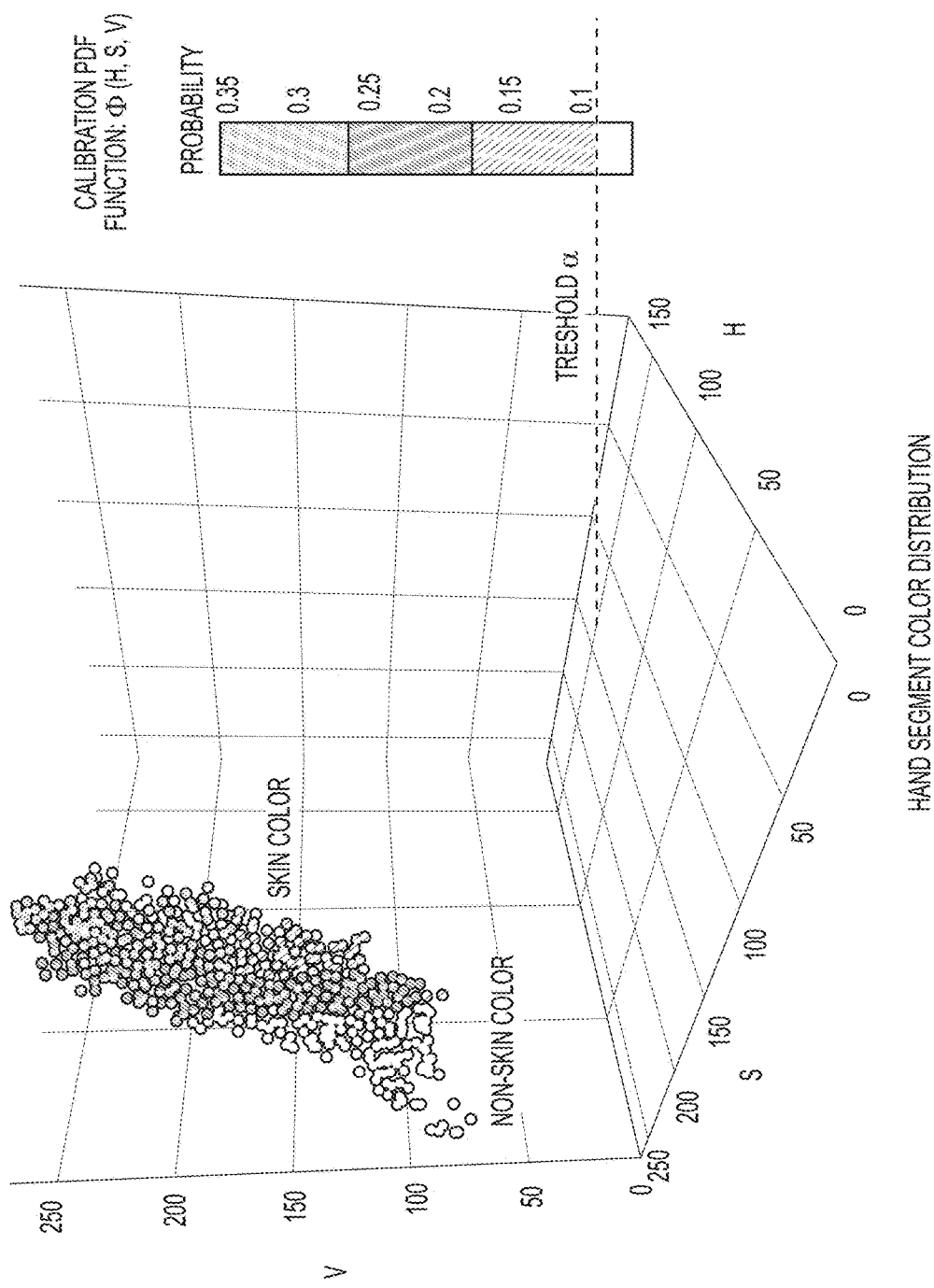

At step 103, calibration target color probability density functions (PDF) of skin color are determined as shown in FIG. 4B; at step 104, a database of the target color calibration PDFs is stored in the storage 40.

At step 105, the skin color detection module 31 performs skin color detection based on the calibration PDFs that were stored in storage 40 in step 104.

Then, hand presence in a VR environment is determined at step 106 by the hand presence module 32 based upon the skin color detection output, and hand position is detected at step 107.

Figure 6:
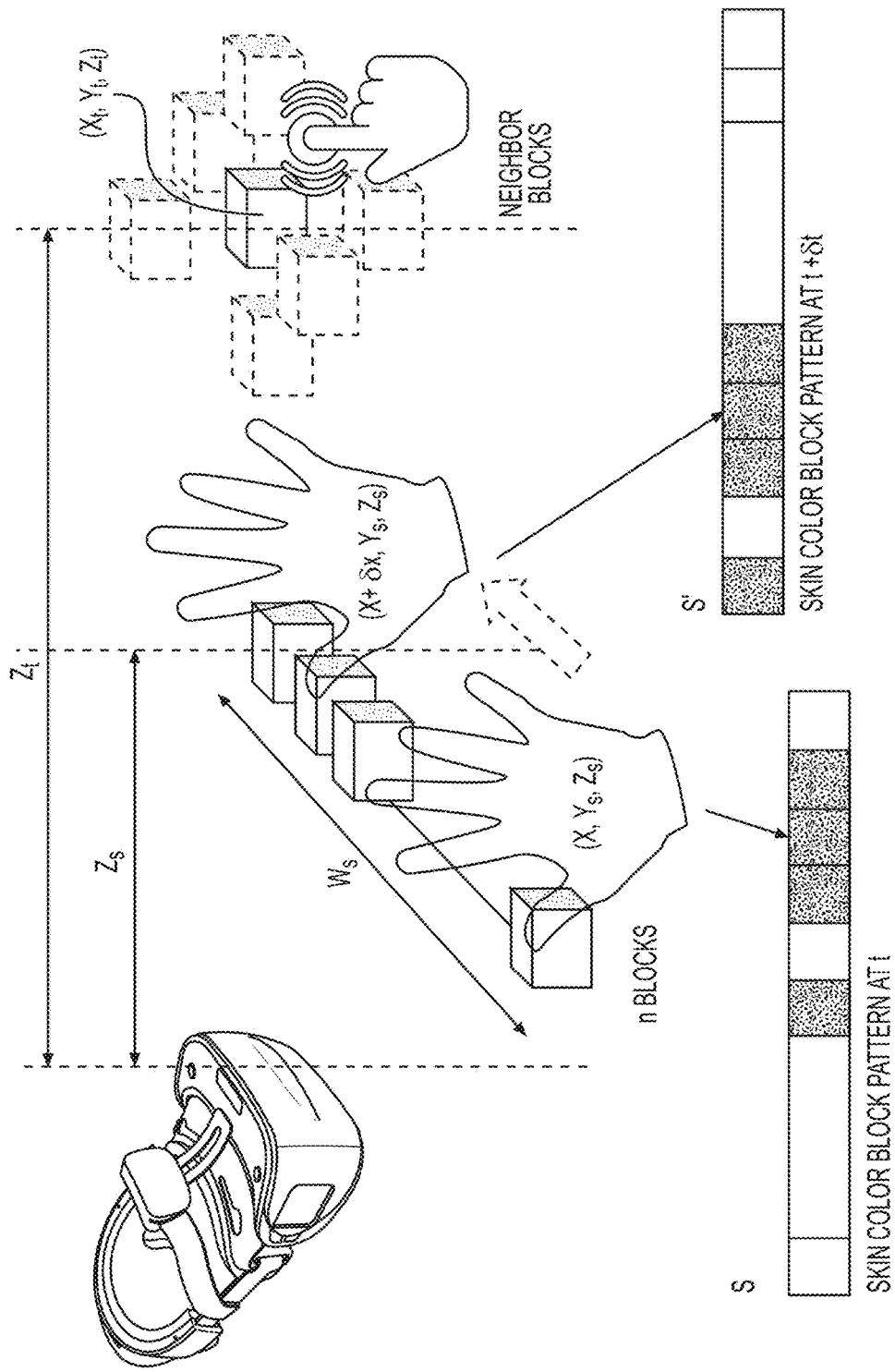
FIG. 6 illustrates hand control, such as hand gesturing and hand movement, in a VR environment and data used to determine the hand gesturing and movement according to an embodiment of the present invention.

Then, hand control, such as hand gestures/movement, is determined in step 108 by the hand control module 34. At step 108, the hand control module 34 receives the output from the skin color detection module 31 and determines hand gestures in the VR environment through displacement and moving speed. As shown in FIG. 6, the user operates a graphical user interface (GUI) or virtual objects in virtual reality by using different kinds of hand gestures, such as handswiping (in any direction), or a single or double tap not limited thereto, but by way of examples, or moving the hand (real object) in/to a particular position(s) in a real space, at step 109. The hand control module 34 detects a color change sequence at the particular position(s) in real space based upon the skin color detection output.

At step 110, the rendering module 36 performs VR rendering based upon a corresponding change of GUI/virtual objects to the color change sequence at the particular position(s) with inputs from the hand presence module 32, the hand control module 34 and the VR content module 38.

If no GUI or virtual objects are detected, the process returns to step 105.

It is to be noted that in other embodiments of the present invention, the calibration process need not be performed.

During calibration at steps 101-104, the processor 24 turns on the left and right video cameras 14a, 14b on the VR HMD 10 and asks the user to put his/her hand on a dedicated region as shown in FIG. 4A. All of the color pixel values of pixels of the region are collected (captured) by the left and right video cameras 14a, 14b (step 101), and analyzed by the calibration module 30 in a pre-defined color space to form a probability density function as shown in the graph of hand detection color distribution shown in FIG. 4B. A Boolean function p(x,y) is defined to filter in the pixels which are most likely skin pixels. Through experimental results, a is defined as a threshold probability value for skin color. When Φ(I(x,y))>a, p(x,y) is set to 1; otherwise set to 0. Φ(I(x,y)), step 103, returns the skin color probability of the color at image pixel (x,y).

In one embodiment, for a pre-defined color space, a color could be represented in 3 components: hue, saturation and value. "Hue" describes a perceived color (e.g. red, yellow, green, etc.) which is arranged in a cyclic manner (circle of colors). Hue is denoted in [0-179] range, where red is 0, yellow is 30, green is 60, and so on, and reaches back to red color in 179. "Saturation" describes the colorfulness and is denoted in the [0-255] range. The smaller the number, the more the color reaches to the greyscale color. "Value" is the brightness and is also denoted in the [0-255] range. The smaller the number, the darker is the color.

The HSV color space is suitable to illustrate a distribution of color of a hand, which is sensitive to lights and shadows. The collection of HSV values gives a 3D histogram. The frequency (number of counts) of a specific HSV vector (a 3D region shown in FIG. 4B of an H/S/V range is specified, e.g. {H=[28-32] and S=[240-255] and V=[240-255]} for "very bright yellow colors"), to determine how dense the pixels are inside a sub-region of the HSV color space.

The whole HSV color space is divided into even length HSV vectors. Each of HSV vectors is a 3D region of size (4×85×85). In other words, H is divided into 45 levels ([0-3], [4-7], ..., [176-179]), S and V are each divided into the following 3 levels ([0-85], [86-170], [171-255]). For each HSV vector, a "probability" of each HSV vector is obtained by (frequency/total number of pixels in the collection. The sum of the probabilities of all HSV vectors is equal to 1.

The probability density functions (PDFs) obtained from calibration are called "calibration PDFs", which are stored in the storage 40. The calibration PDFs are then used for hand presence and control.

At step 105, the skin color detection module 31 makes a detailed calculation of non-skin color detection of the captured images from the left and right video cameras is as follows:

Skin color is determined not to be found at a position if:
P (X,Y,Z)=$p_l$(xl,yl)$p_r$(xr,yr) is equal to 0
By extending the pinhole camera model to stereo camera scenario:

$$xl = \left(\frac{X + \frac{d}{2}}{Z}\right)f_l \quad yl = \frac{Yf_l}{Z} \quad xr = \left(\frac{X - \frac{d}{2}}{Z}\right)^5 f_r \quad yr = \frac{Yf_r}{Z}$$

where d is called disparity, the length between the two video cameras 14a, 14b.
And (X, Y, Z) is the position defined from the mid-point (0,0,0) between the video cameras 14a, 14b
$f_l$ and $f_r$ are the focal length (in unit of pixels) of the left and right video cameras 14a, 14b respectively
(xl, yl) and (xr, yr) are the 2D coordinates where the 3D point projects on the left and right images from the left and right video cameras 14a, 14b, respectively.
$p_l$,$p_r$ are the Boolean function of the left and right video cameras 14a, 14b, respectively.

At step 106, alpha-blending of the color pixels is performed of captured images with a virtual reality background by varied alpha values based on a function of the target color probabilities. A detailed calculation for hand presence in a VR environment is as follows.

The hand presence module 32 defines a merged reality space (where the hand is merged with the virtual reality environment) as composed by n real space blocks as shown in FIG. 5B and the corresponding image pixel sets of the left and right video cameras 14a, 14b to a real space block with width W, height H, depth D and center (Xs, Ys, Zs) (see FIG. 5A) are as follows:

$$Xsl_{ik} = \left(\frac{(Xs + i\frac{W}{2m}) + \frac{d}{2}}{Zs + k\frac{D}{2q}}\right)f_l \quad Xsr_{ik} = \left(\frac{(Xs + i\frac{W}{2m}) - \frac{d}{2}}{Zs + k\frac{D}{2q}}\right)f_r$$

$$Ysl_{jk} = \frac{(Ys + j\frac{H}{2n})f_l}{Zs + k\frac{D}{2q}30} \quad Ysr_{jk} = \frac{(Ys + j\frac{H}{2n})f_r}{Zs + k\frac{D}{2q}}$$

Where i ∈{-m ... m}, j∈{-n ... n}, k∈{-q ... q}
For each block,
If (P(Xs,Ys,Zs)=0) {
Alpha Value at Image Pixel ($Xsl_{ik}$, $Ysl_{jk}$) is set to be τ
Alpha Value at Image Pixel ($Xsr_{jk}$, $Ysr_{jk}$) is set to be τ}
Else{
Alpha Value at Image Pixel ($Xsl_{jk}$, $Ysl_{jk}$)=ψ($Φ_l$(I($Xsl_{jk}$, $Ysl_{jk}$)))
Alpha Value at Image Pixel ($Xsr_{jk}$, $Ysr_{jk}$)=ψ($Φ_r$(I($Xsr_{jk}$, $Ysr_{jk}$))) }
where τ∈[0,1], s∈{0 ... n−1}, $Φ_l$ is the PDF of the left video camera 14a, $Φ_r$ is the PDF of the right video camera 14b, I is the color and ψ:X→Y, X∈[0,1] and Y∈[τ, 1], is a pre-defined mapping function of skin color probability to alpha blending value, which ranges from 0.0 to 1.0, where 0.0 represents a fully transparent color, and 1.0 represents a fully opaque color, as shown in FIG. 5C.

At step 107, hand position is detected in a VR environment.

Then, hand control, such as hand gestures/movement, is determined in step 108 by the hand control module 34. At step 108, the hand control module 34 receives the output from the skin color detection module 31 and determines hand gestures in the VR environment through displacement and moving speed. As shown in FIG. 6, the user operates a graphical user interface (GUI) or virtual objects in virtual reality by using different kinds of hand gestures, such as handswiping (in any direction), or a single or double tap not limited thereto, but by way of examples, or moving the hand (real object) in/to a particular position(s) in a real space, at step 109. The hand control module 34 detects a color change sequence at the particular position(s) in real space based upon the skin color detection output.

Further, it is to be noted that while the present embodiments disclose that the hand control detection is performed after the hand presence detection, according to other embodiments, the hand control detection can be performed before the hand presence detection, or only one of the hand presence detection and the hand control detection can be performed.

The detailed calculation for hand control (gesturing/movement) in the VR environment as shown in FIG. 6 is as follows:

In detecting a horizontal swipe of the hand, $S=\{P(X, Y_s, Z_s)\}$ where $X \in \{-Ws/2, Ws/2\}$ $S'=S(t+\delta t)$ where $\delta t$ is a unit set.

$$H = \{S'(X + \delta xi)\} \text{ where } \delta xi = \frac{iWs}{n} \text{ and } i \in \left\{0, \frac{n}{2}\right\}$$

Where $Y_s$ and $Z_s$ are the y-coordinate and z-coordinate of the real space blocks of interest from the mid-point between the left and right video cameras 14a, 14b, respectively.

And $W_s$ is the sum of the width of the real space blocks of interest which are tiled in x-direction.

S is the series of skin color occurrence values $P(X, Y_s, Z_s)$ for the real space blocks of interest at particular time t and S' is that at next time t+δt δxi is the shift distance in x-direction of the real space blocks of interest.

H is the collection of copies of S' with different shifting distance.

$$\text{Hand Displacement} = \delta x \text{ and Hand Velocity} = \frac{\delta x}{\delta t}.$$

If $(S \cap S'(X+\delta x)) = \text{Max} (S \cap H)$ and
Max $(S \cap H) > \delta_{swipe}$
Where $\delta_{swipe-}$ is the threshold value
In detecting a single or double tap of the hand, $S=\{P(X_t+k, Y_t+k, Z_t+k)\}$ $$S' = \{S(t + \delta t)\} \text{ where } \delta t = \frac{i}{30} \text{ and } i \in \{0, 30\}$$

Where {k} are a target real space block and the neighboring real space blocks.

S is the series of skin occurrence values $P(X_t+k, Y_t+k, Z_t+k)$ for the real space blocks of interest at particular time t and S' is a sequence of S at the following time frames.

More particularly, for a double tap hand gesture, Double Tap=True if $S' \cap S_{double-tap} > \delta_{double-tap}$ where $S_{double-tap}$ is pre-defined and $\delta_{double-tap}$ is the threshold value $S_{double-tap}$ is pre-defined sequence pattern which confirms a double-tap when a given sequence of S' matches with it at certain criteria.

More particularly, for a single tap hand gesture,
Single Tap=True if $S' \cap S_{single-tap} > \delta_{single-tap}$
where $S_{single-tap}$ is pre-defined and $\delta_{single-tap}$ is the threshold value $S_{single-tap}$ is pre-defined sequence pattern which confirms a single-tap when a given sequence of S' matches with it at certain criteria.

Figure 7A:
FIGS. 7A and 7B illustrate diagrams of simulation results of (a) hand presence and (b) hand control in VR according to an embodiment of the present invention.
Figure 7B:
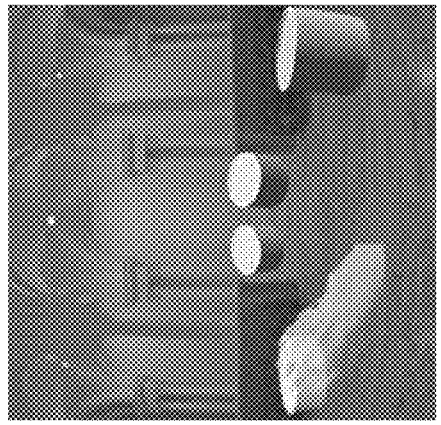
Figure 7B:
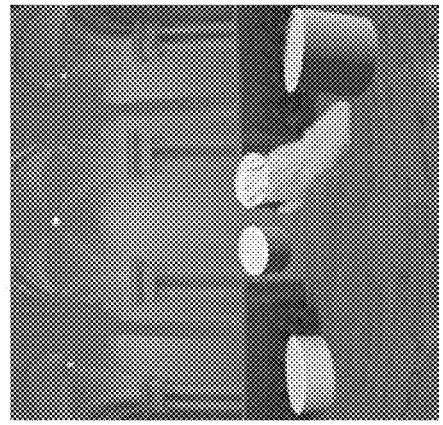
Figure 7B:
Figure 7B:
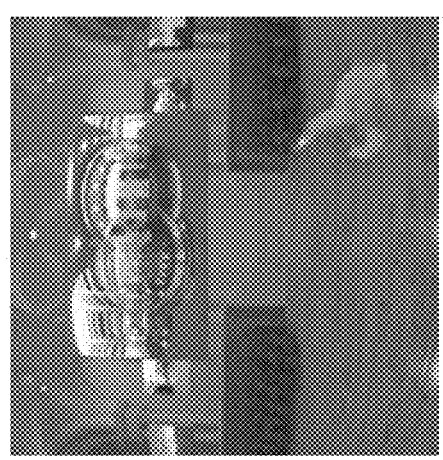
Figure 7B:
Figure 7B:
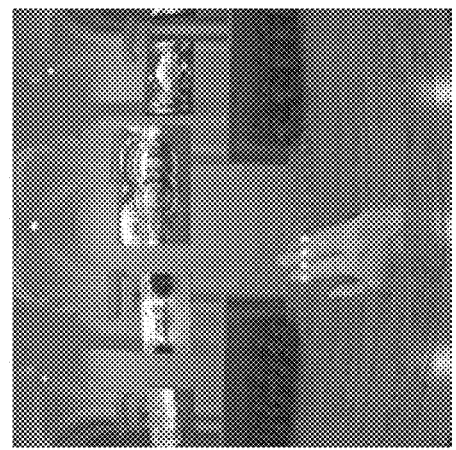

FIG. 7A illustrates a diagram of simulation results of hand presence performed by the hand presence module 32 according to an embodiment of the present invention and FIG. 7B illustrates a diagram of hand control in the VR environment performed by the hand control module 34 according to this embodiment of the present invention. The simulation results show that using stereo video cameras (left and right video cameras 14a, 14b) for hand presence in a VR application/environment is promising. The result also shows that it is practical to perform hand control in the VR environment, including (i) a horizontal swipe, (ii) a double tap and (iii) operating virtual objects, as just merely examples. The single tap is not shown in FIGS. 7A and 7B, but could readily be realized as being only one of the two taps of the double tap.

As set forth above, according to embodiments of the present invention, an apparatus and method for detecting hand presence in free space using a virtual reality head mounted display system makes use of the hand detected to determine hand control (gestures/movement) of the detected hand in the VR environment.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of detecting presence and control of a real object in a virtual reality environment, comprising:
taking color pixel values of captured images in a field of view of an image sensor, and alpha-blending the color pixels of the captured images with a virtual reality background using varied alpha values based on a function of target color probability density functions of the captured images;
receiving inputs of the real object which operates a graphical user interface (GUI) or a virtual object in virtual reality by using different kinds of real object movements or moving the real object in or to a particular position or positions in a real space;
detecting a color change sequence at the particular position or positions in the real space; and
rendering the corresponding change of the GUI or virtual object to the color change sequence at the particular position or positions based upon the received inputs of the real object;

wherein
the image sensor comprises first and second video cameras, and the function of target color probability density functions is determined according to:
defining a merged reality space composed of n real space blocks; and
for each n real space block,
assigning the varied alpha values to the corresponding set of color pixel pairs to each real space block according to the following:
If (P(Xs,Ys,Zs)==0) {
Alpha Value at Image Pixel $(Xsl_{jk}, Ysl_{jk})$ is set to be $\tau$
Alpha Value at Image Pixel $(Xsr_{jk}, Ysr_{jk})$ is set to be $\tau$}
Else{
Alpha Value at Image Pixel $(Xsl_{jk}, Ysl_{jk})=\psi(\Phi_l(l(Xsl_{jk}, Ysl_{jk})))$
Alpha Value at Image Pixel $(Xsr_{jk}, Ysr_{jk})=\psi(\Phi_r(l(Xsr_{jk}, Ysr_{jk})))$ }
where $\tau \in [0,1]$, $s \in \{0 \ldots n-1\}$, $\Phi_l$ is the PDF of the first video camera which is a left video camera, $\Phi_r$ is the PDF of the second video camera which is a right video camera, l is the color and $\psi$ is a pre-defined mapping function of target color probability to alpha blending value starting from $\tau$.

2. A method of detecting presence and control of a real object in a virtual reality environment, comprising:
taking color pixel values of captured images in a field of view of an image sensor, and alpha-blending the color pixels of the captured images with a virtual reality background using varied alpha values based on a function of target color probability density functions of the captured images;
receiving inputs of the real object which operates a graphical user interface (GUI) or a virtual object in virtual reality by using different kinds of real object movements or moving the real object in or to a particular position or positions in a real space;
detecting a color change sequence at the particular position or positions in the real space; and
rendering the corresponding change of the GUI or virtual object to the color change sequence at the particular position or positions based upon the received inputs of the real object;
capturing the color pixel values of the images in the field of view using the image sensing sensor, and taking the color pixel values from a pre-defined sampling area of the real object; and
performing a calibration process by finding the target color probability density functions in a hue, saturation and value (HSV) color domain by collecting the color pixel values from the real object in a finite set of the captured images as data samples;
wherein
the HSV color domain is pre-defined for different kinds of real objects, the image sensor comprises first and second video cameras, and the function of target color probability density functions is determined according to:
defining a merged reality space composed of n real space blocks; and
for each n real block space,
assigning the varied alpha values to the corresponding set of color pixel pairs to each real space block according to the following:
If (P(Xs, Ys, Zs)==0) {
Alpha Value at Image Pixel $(Xsl_{jk}, Ysl_{jk})$ is set to be $\tau$
Alpha Value at Image Pixel $(Xsr_{jk}, Ysr_{jk})$ is set to be $\tau$}
Else{
Alpha Value at Image Pixel $(Xsl_{jk}, Ysl_{jk})=\psi(\Phi_l(l(Xsl_{jk}, Ysl_{jk})))$
Alpha Value at Image Pixel $(Xsr_{jk}, Ysr_{jk})=\psi(\Phi_r(l(Xsr_{jk}, Ysr_{jk})))$ }
where $\tau \in [0,1]$, $s \in \{0 \ldots n-1\}$, $\Phi_l$ is the PDF of the first video camera which is a left video camera, $\Phi_r$ is the PDF of the second video camera which is a right video camera, l is the color and $\psi$ is a pre-defined mapping function of target color probability to alpha blending value starting from $\tau$.

3. The method of claim 2, wherein the operating of the GUI or virtual object comprises at least one of:
determining a horizontal swipe of a menu of the GUI or the virtual object by the real object;
determining a double tap of a menu of the GUI or the virtual object by the real object; and
determining a single tap of a menu of the GUI or the virtual object by the real object.

4. The method of claim 3, wherein:
the determining of the horizontal swipe uses the color change sequence and is determined according to the following:

$S=\{P(X, Y_s, Z_s)\}$ where $X, \in \{-Ws/2, Ws/2\}$ $S'=S(t+\delta t)$ where $\delta t$ is a unit set $$H = \{S'(X + \delta xi)\} \text{ where } \delta xi = \frac{iWs}{n} \text{ and } i \in \left\{0, \frac{n}{2}\right\}$$

Where $Y_s$ and $Z_s$ are the y-coordinate and z-coordinate of the real space blocks of interest from the mid-point between the video cameras 14a, 14b, respectively
And $W_s$ is the sum of the width of the real space blocks of interest which are tiled in x-direction
S is the series of target color occurrence values $P(X, Y_s, Z_s)$ for the real space blocks of interest at particular time t and S' is that at next time t+$\delta$t
$\delta$xi is the shift distance of the real space blocks of interest
H is the collection of copies of S' with different shifting distance
Real Object Displacement =$\delta$x and Real Object Velocity $$= \frac{\delta x}{\delta t}$$

If (S∩S'(X+$\delta$x)=Max (S∩H) and
Max (S∩H)>$\delta_{swipe}$
Where $\delta_{swipe}$ is the threshold value
the determining of the double tap uses the color change sequence and is determined according to the following;

$S=\{P(X_t+k, Y_t+k, Z_t+k)\}$ $$S' = \{S(t + \delta t)\} \text{ where } \delta t = \frac{i}{30} \text{ and } i \in \{0, 30\}$$

Where {k} are a target real space block and the neighboring real space blocks
S is the series of target color occurrence values $P(X_t+k, Y_t+k, Z_t+k)$ for the real space blocks of interest at particular time t and S' is a sequence of S at the following time frames Double Tap=True if $S'\cap S_{double-tap} > \delta_{double-tap}$
where $S_{double-tap}$ is pre-defined and $\delta_{double-tap}$ is the threshold value
the determining of the single tap uses the color change sequence and is determined according to the following:

$$S=\{P(X_t+k, Y_t+k, Z_t+k)\}$$

$$S' = \{S(t+\delta t)\} \text{ where } \delta t = \frac{i}{30} \text{ and } i \in \{0, 30\}$$

Where {k} are a target real space block and the neighboring real space blocks S is the series of target color occurrence values $P(X_t+k, Y_t+k, Z_t+k)$ for the real space blocks of interest at particular time t and S' is a sequence of S at the following time frames
Single Tap=True if $S'\cap S_{single-tap} > \delta_{single-tap}$
where $S_{single-tap}$ is pre-defined and $\delta_{single-tap}$ is the threshold value.

5. A system to detect presence and control of a real object in a virtual reality environment, comprising:
   an image sensor to take color pixel values of captured images in a field of view; and
   a processor comprising:
     a real object presence module alpha-blending the color pixels of the captured images with a virtual reality background using varied alpha values based on a function of target color probability density functions of the captured images;
     a real object control module:
       to receive inputs of the real object which operates a graphical user interface (GUI) or a virtual object in virtual reality by using different kinds of real object movements or moving the real object in or to a particular position or positions in a real space, and
       to detect a color change sequence at the particular position or positions in the real space; and
     a rendering module to render the corresponding change of the GUI or virtual object to the color change sequence at the particular position or positions based upon the received inputs of the real object;
   wherein:
   the image sensor comprises first and second video cameras, and
   the real object presence module determines the function of target color probability density functions according to:
   defining a merged reality space composed of n real space blocks; and
   for each n real space block assigning the varied alpha values to the corresponding set of color pixel pairs to each real space block according to the following:
   If (P(Xs, Ys, Zs)==0) {
   Alpha Value at Image Pixel ($Xsl_{jk}$, $Ysl_{jk}$) is set to be τ
   Alpha Value at Image Pixel ($Xsr_{jk}$, $Ysr_{jk}$) is set to be τ}
   Else{
   Alpha Value at Image Pixel ($Xsl_{jk}$, $Ysl_{jk}$)=ψ($\Phi_l$(l($Xsl_{jk}$, $Ysl_{jk}$)))
   Alpha Value at Image Pixel ($Xsr_{jk}$, $Ysr_{jk}$)=ψ($\Phi_r$(l($Xsr_{jk}$, $Ysr_{jk}$))) }
   where τ∈[0,1], s ∈{0 . . . n−1}, $\Phi_l$ is the PDF of the first video camera which is a left video camera, $\delta_r$ is the PDF of the second video camera which is a right video camera, l is the color and ψ is a pre-defined mapping function of target color probability to alpha blending value starting from τ.

6. A system to detect presence and control of a real object in a virtual reality environment, comprising:
   an image sensor to take color pixel values of captured images in a field of view; and
   a processor comprising:
     a real object presence module alpha-blending the color pixels of the captured images with a virtual reality background using varied alpha values based on a function of target color probability density functions of the captured images;
     a real object control module:
       to receive inputs of the real object which operates a graphical user interface (GUI) or a virtual object in virtual reality by using different kinds of real object movements or moving the real object in or to a particular position or positions in a real space, and
       to detect a color change sequence at the particular position or positions in the real space; and
     a rendering module to render the corresponding change of the GUI or virtual object to the color change sequence at the particular position or positions based upon the received inputs of the real object;
   the image sensor capturing the color pixel values of the images in the field of view; and
   the processor further comprising:
   a calibration module:
     to take the color pixel values from a pre-defined sampling area of the real object; and
     to perform a calibration process by finding the target color probability density functions in a hue, saturation and value (HSV) color space by collecting the color pixel values from the real object in a finite set of the captured images as data samples,
   wherein the HSV color domain is pre-defined for different kinds of real objects,
   the image sensor comprises first and second video cameras; and
   the real object presence module determines the function of target color probability density functions according to:
   defining a merged reality space composed of n real space blocks; and
   for each n real space block,
   assigning the varied alpha values to the corresponding set of color pixel pairs to each real space block according to the following:
   If (P(Xs,Ys,Zs)==0) {
   Alpha Value at Image Pixel ($Xsl_{jk}$, $Ysl_{jk}$) is set to be τ
   Alpha Value at Image Pixel ($Xsr_{jk}$, $Ysr_{jk}$) is set to be τ}
   Else{
   Alpha Value at Image Pixel ($Xsl_{jk}$, $Ysl_{jk}$)=ψ($\Phi_l$(l($Xsl_{jk}$, $Ysl_{jk}$)))
   Alpha Value at Image Pixel ($Xsr_{jk}$, $Ysr_{jk}$)=ψ($\Phi_r$(l($Xr_{jk}$, $Ysr_{jk}$))) }
   where τ∈[0,1], s ∈{0 . . . n−1}, $\Phi_l$ is the PDF of the first video camera which is a left video camera, $\Phi_r$ is the PDF of the second video camera which is a right video camera, I is the color and ψ is a pre-defined mapping function of target color probability to alpha blending value starting from τ.

7. The system of claim 6, wherein the operating of the GUI or virtual object comprises at least one of:
   determining a horizontal swipe of a menu of the GUI or the virtual object by the real object;
   determining a double tap of a menu of the GUI or the virtual object by the real object; and determining a single tap of a menu of the GUI or the virtual object by the real object.

8. The system of claim 7, wherein:

the determining of the horizontal swipe uses the color change sequence and is determined according to the following:

$S=\{P(X, Y_s, Z_s)\}$ where $X \in \{\text{'}W_s/2, W_s/2\}$ $S' = S(t+\delta t)$ where $\delta t$ is a unit set $H = \{S'(X + \delta xi)\}$ where $\delta xi = \frac{iW_s}{n}$ and $i \in \{0, \frac{n}{2}\}$ Where $Y_s$ and $Z_s$ are the y-coordinate and z-coordinate of the real space blocks of interest from the mid-point between the video cameras 14a, 14b, respectively And $W_s$ is the sum of the width of the real space blocks of interest which are tiled in x-direction S is the series of target color occurrence values $P(X, Y_s, Z_s)$ for the real space blocks of interest at particular time t and S' is that at next time t+δt δxi is the shift distance of the real space blocks of interest H is the collection of copies of S' with different shifting distance.

Real Object Displacement =δX and Real Object Velocity $= \frac{\delta x}{\delta t}$ If $(S \cap S'(X+\delta x))=\text{Max } (S \cap H)$ and
Max $(S \cap H) > \delta_{swipe}$
Where $\delta_{swipe}$ is the threshold value the determining of the double tap uses the color change sequence and is determined according to the following;

$S=\{P(X_t+k, Y_t+k, Z_t+k)\}$ $S' = \{S(t + \delta t)\}$ where $\delta t = \frac{i}{30}$ and $i \in \{0, 30\}$ Where {k} are a target real space block and the neighboring real space blocks
S is the series of target color occurrence values $P(X_t+k, Y_t+k, Z_t+k)$ for the real space blocks of interest at particular time t and S' is a sequence of S at the following time frames
Double Tap=True if $S\_' \cap S_{double-tap} > \delta_{double-tap}$
where $S_{double-tap}$ is pre-defined and $\delta_{double-tap}$ is the threshold value
the determining of the single tap uses the color change sequence and is determined according to the following:

$S=\{P(X_t+k, Y_t+k, Z_t+k)\}$ $S' = \{S(t + \delta t)\}$ where $\delta t = \frac{i}{30}$ and $i \in \{0, 30\}$ Where {k} are a target real space block and the neighboring real space blocks
S is the series of target color occurrence values $P(X_t+k, Y_t+k, Z_t+k)$ for the real space blocks of interest at particular time t and S' is a sequence of S at the following time frames
Single Tap=True if $S' \cap S_{single-tap} > \delta_{single-tap}$
where $S_{single-tap}$ is pre-defined and $\delta_{single-tap}$ is the threshold value.

* * * * *